(12) United States Patent
Yoshii

(10) Patent No.: US 12,138,798 B2
(45) Date of Patent: Nov. 12, 2024

(54) CONTROL METHOD FOR ROBOT SYSTEM AND ROBOT SYSTEM

(71) Applicant: SEIKO EPSON CORPORATION, Tokyo (JP)

(72) Inventor: Koji Yoshii, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 345 days.

(21) Appl. No.: 17/584,413

(22) Filed: Jan. 26, 2022

(65) Prior Publication Data

US 2022/0234201 A1 Jul. 28, 2022

(30) Foreign Application Priority Data

Jan. 28, 2021 (JP) .................................. 2021-011876

(51) Int. Cl.
*B25J 9/16* (2006.01)
*B25J 9/00* (2006.01)
*B25J 19/02* (2006.01)

(52) U.S. Cl.
CPC ........... *B25J 9/1653* (2013.01); *B25J 9/0093* (2013.01); *B25J 9/1669* (2013.01); *B25J 9/1697* (2013.01); *B25J 19/023* (2013.01)

(58) Field of Classification Search
None
See application file for complete search history.

(56) References Cited

U.S. PATENT DOCUMENTS 10,410,339 B2 * 9/2019 Ohnuki .................. G06F 18/22
10,576,636 B1 * 3/2020 Islam ..................... B25J 9/1692
2007/0007924 A1 * 1/2007 Nishihara .......... G05B 19/4182
    318/560
2011/0208347 A1 * 8/2011 Otake .................... B25J 9/1697
    700/174
2012/0229620 A1 * 9/2012 Ikeda ..................... B25J 9/1692
    348/94
2012/0236140 A1 * 9/2012 Hazeyama ............. B25J 9/1697
    348/94
2016/0096273 A1 * 4/2016 Burns .................. G05B 19/401
    700/259
2019/0039237 A1   2/2019 Nakashima et al.
2019/0077010 A1 * 3/2019 Ando ..................... B65G 47/52

FOREIGN PATENT DOCUMENTS

JP    2012210675 A    11/2012
JP    2019025618 A    2/2019

* cited by examiner

*Primary Examiner* — Adam R Mott
*Assistant Examiner* — Alan Lindsay Ostrow
(74) *Attorney, Agent, or Firm* — Samson G. Yu

(57) ABSTRACT

A control method for a robot system is a control method for a robot system including a conveying device configured to convey a target object and a robot configured to perform work while following the target object conveyed by the conveying device, the control method for the robot system including an image acquiring step for imaging, a plurality of times, the target object conveyed by the conveying device and acquiring a plurality of images, a reciprocating displacement information acquiring step for acquiring, based on the plurality of images, reciprocating displacement information indicating periodical reciprocating displacement in a width direction orthogonal to a conveying direction of the target object, and a correcting step for correcting a position command for the robot based on the reciprocating displacement information.

7 Claims, 4 Drawing Sheets

CONTROL METHOD FOR ROBOT SYSTEM AND ROBOT SYSTEM

The present application is based on, and claims priority from JP Application Serial Number 2021-0011876, filed Jan. 28, 2021, the disclosure of which is hereby incorporated by reference herein in its entirety.

BACKGROUND

1. Technical Field

The present disclosure relates to a control method for a robot system and the robot system.

2. Related Art

JP-A-2019-025618 (Patent Literature 1) discloses a robot control method for imaging, with a camera, a workpiece conveyed by a conveying device such as a belt conveyor and calculating, based on a result of the imaging and conveying speed of the conveying device, a picking predicted position where the workpiece conveyed by the conveying device is picked by a picking device and a posture of the workpiece in the position.

However, in the robot control method, only the picking predicted position and the posture of the workpiece in the position are calculated. Therefore, there is no problem in performing instantaneous work for, for example, picking up the workpiece conveyed by the conveying device in the picking predicted position. However, for example, when performing continuous work while following the workpiece conveyed by the conveying device, positions and postures of the workpiece at respective times are unknown and the work cannot be accurately performed.

SUMMARY

A control method for a robot system according to an aspect of the present disclosure is a control method for a robot system including a conveying device configured to convey a target object and a robot configured to perform work while following the target object conveyed by the conveying device, the control method for the robot system including: an image acquiring step for imaging, a plurality of times, the target object conveyed by the conveying device and acquiring a plurality of images; a reciprocating displacement information acquiring step for acquiring, based on the plurality of images, reciprocating displacement information indicating periodical reciprocating displacement in a width direction orthogonal to a conveying direction of the target object; and a correcting step for correcting a position command for the robot based on the reciprocating displacement information.

A robot system according to an aspect of the present disclosure includes: a conveying device configured to convey a target object; a robot configured to perform work while following the target object conveyed by the conveying device; an imaging section configured to image the target object conveyed by the conveying device; and a control device configured to acquire, based on a plurality of images captured by the imaging section, reciprocating displacement information indicating periodical reciprocating displacement in a width direction orthogonal to a conveying direction of the target object and correct a position command for the robot based on the reciprocating displacement information.

DESCRIPTION OF EXEMPLARY EMBODIMENTS

A control method for a robot system and the robot system according to the present disclosure are explained in detail below with reference to an embodiment shown in the accompanying drawings.

Figure 1:
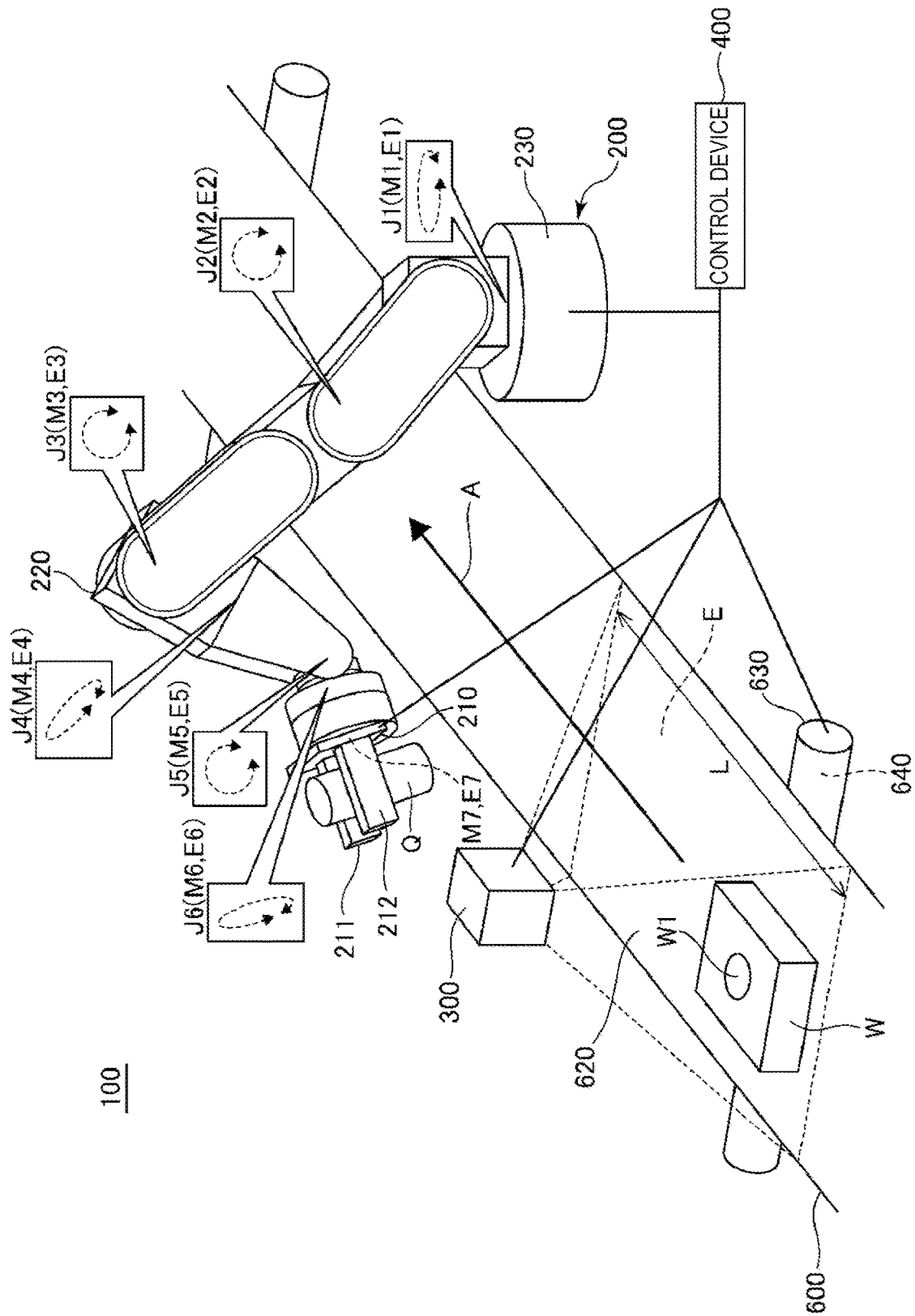
FIG. 1 is an overall configuration diagram of a robot system according to a preferred embodiment.
Figure 2:
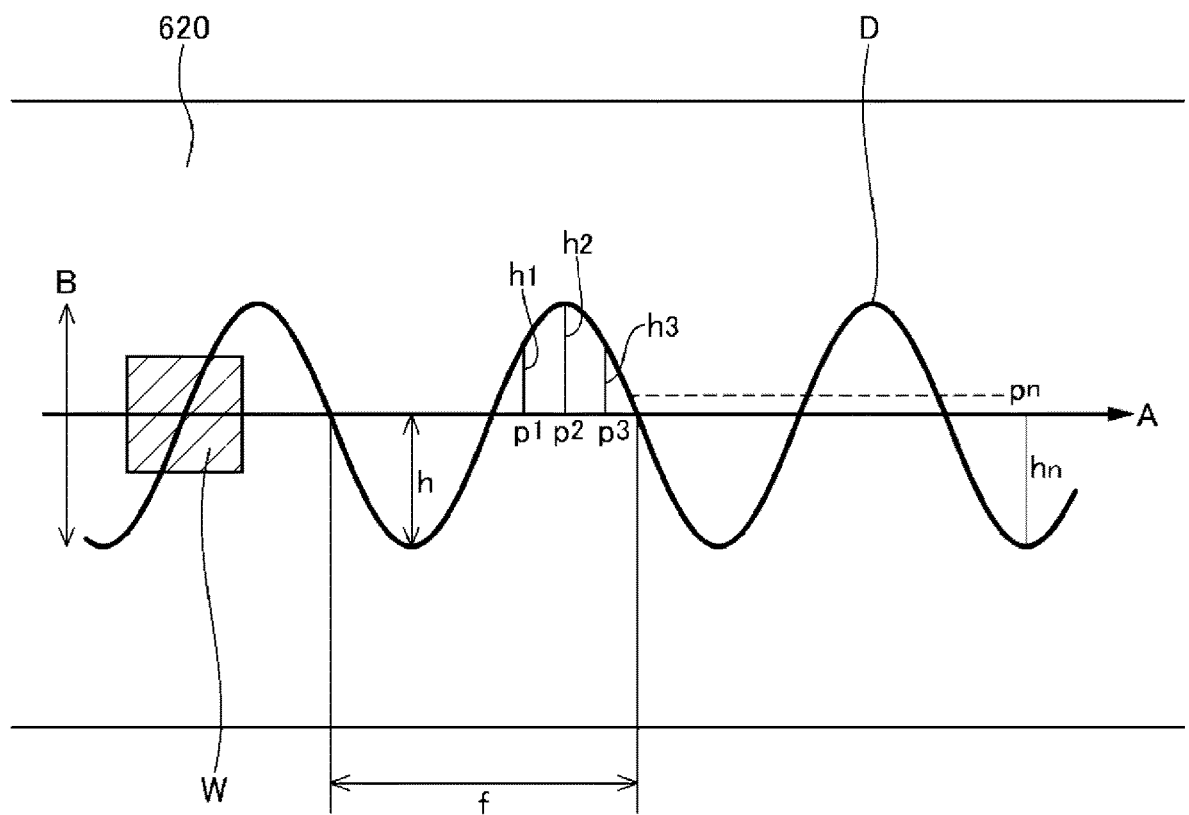
FIG. 2 is a plan view showing conveyance of a workpiece.
Figure 3:
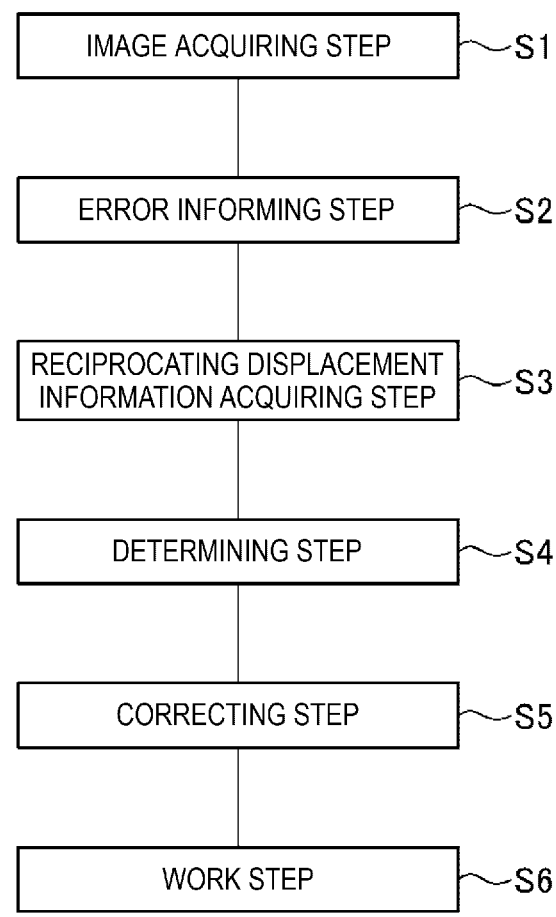
FIG. 3 is a flowchart showing a control process for the robot system.
Figure 4:
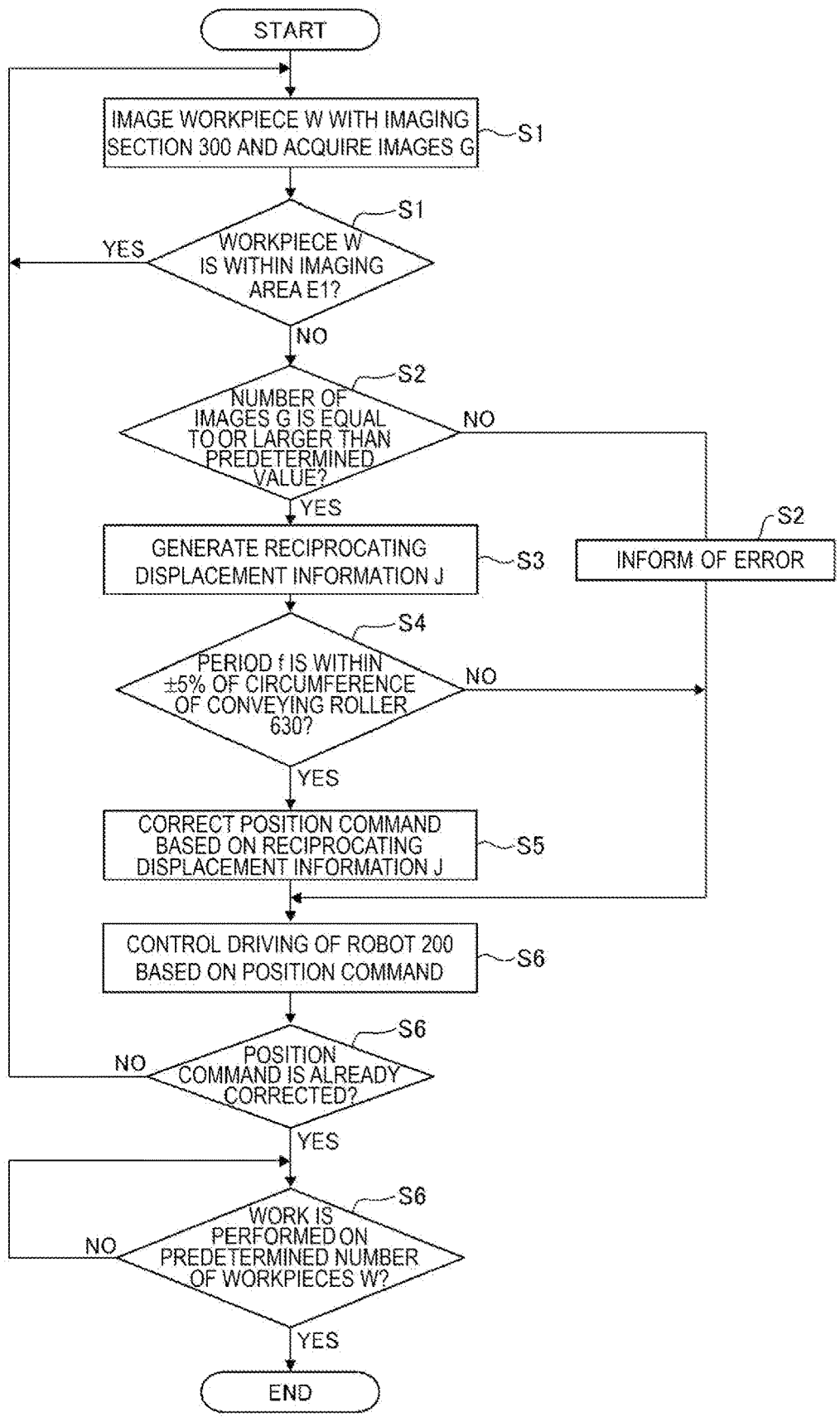
FIG. 4 is a flowchart showing, in detail, the control process shown in FIG. 3.

FIG. 1 is an overall configuration diagram of a robot system according to a preferred embodiment. FIG. 2 is a plan view showing conveyance of a workpiece. FIG. 3 is a flowchart showing a control process for the robot system. FIG. 4 is a flowchart showing, in detail, the control process shown in FIG. 3.

A robot system 100 shown in FIG. 1 includes a robot 200, an imaging section 300, a control device 400, and a conveying device 600. In the robot system 100, the conveying device 600 conveys a workpiece W, which is a target object, along a conveying direction A, the control device 400 detects a conveying state of the workpiece W based on an image acquired by the imaging section 300, and the robot 200 performs work while following, based on the conveying state of the workpiece W, the workpiece W being conveyed. The work performed on the workpiece W is not particularly limited. Examples of the work include boring, connection (insertion, screwing-clamping, screwing, or the like) to another member, cleaning, and inspection. In the following explanation, work for inserting an insertion object Q into a hole W1 formed in the workpiece W is representatively explained. Examples of the workpiece W include all objects for which work by the robot 200 is possible such as industrial products including a printer and an automobile and components of the industrial products.

The robot 200 includes a base 230 fixed to a floor, a manipulator 220 supported by the base 230, and an end effector 210 supported by the manipulator 220. The manipulator 220 is a robotic arm in which a plurality of arms are turnably coupled. In this embodiment, the manipulator 220 is a six-axis arm including six joints J1 to J6. Among the joints, the joints J2, J3, and J5 are bending joints and the joints J1, J4, and J6 are torsion joints. However, the manipulator 220 is not particularly limited if the manipulator 220 is capable of performing the insertion work explained above.

The end effector 210 is attached to the distal end portion, that is, the joint J6 of the manipulator 220 via a mechanical interface. The end effector 210 includes a pair of claw sections 211 and 212. The end effector 210 grips and releases the insertion object Q by closing and opening the pair of claw sections 211 and 212. However, the end effector 210 is not particularly limited if the end effector 210 can grip and release the insertion object Q. The end effector 210 may be able to attract and grip the insertion object Q with, for example, an air chuck or an electromagnetic chuck.

In the joints J1, J2, J3, J4, J5, and J6, motors M1, M2, M3, M4, M5, and M6 and encoders E1, E2, E3, E4, E5, and E6 that detect rotation amounts of the motors M1, M2, M3, M4, M5, and M6 are respectively set. In the end effector 210, a motor M7 that opens and closes the pair of claw sections 211 and 212 and an encoder E7 that detects a rotation amount of the motor M7 are set. During the operation of the robot system 100, the control device 400 executes feedback control for matching rotation angles of the joints J1 to J6 indicated by outputs of the encoders E1 to E6, separation distances between the claw sections 211 and 212 indicated by an output of the encoder E7, and a position command sent from a not-shown host computer. Consequently, it is possible to cause the robot 200 to perform work corresponding to the position command.

The conveying device 600 is a belt conveyor and includes a belt 620, a conveying roller 630 that feeds the belt 620, a not-shown motor that drives the conveying roller 630, and a conveyance amount sensor 640 that outputs a signal corresponding to a rotation amount of the conveying roller 630 to the control device 400. During the operation of the robot system 100, the control device 400 executes feedback control for matching conveying speed of the workpiece W indicated by an output of the conveyance amount sensor 640 and target conveying speed, which is a control target. Consequently, it is possible to stably convey the workpiece W at desired speed.

The imaging section 300 is a camera that images a workpiece from above the conveying device 600 and outputs a captured image to the control device 400. An imaging area E of the imaging section 300 is located further upstream of the conveying direction A than a work area of the robot 200. As indicated by a broken line in FIG. 1, the imaging section 300 has an angle of view including the workpiece W conveyed on the belt 620. A position in the image output from the imaging section 300 is correlated with a position in a conveying path by the control device 400. Therefore, when the workpiece W is present in the angle of view of the imaging section 300, a coordinate of the workpiece W can be specified based on the position of the workpiece W in the image output from the imaging section 300.

The control device 400 controls driving of the robot 200, the imaging section 300, and the conveying device 600. Such a control device 400 is configured from, for example, a computer and includes a processor (a CPU) that processes information, a memory communicably coupled to the processor, and an external interface that performs coupling to an external device. Various programs executable by the processor are stored in the memory. The processor can read and execute the various programs and the like stored in the memory. A part or all of the components of the control device 400 may be disposed on the inner side of a housing of the robot 200. The control device 400 may be configured by a plurality of processors.

The configuration of the robot system 100 is briefly explained above. Subsequently, a control method for the robot system 100 by the control device 400 is explained.

The conveying device 600 is designed to linearly convey the workpiece W along the conveying direction A. A position command for the robot 200 is created based on this premise. However, in an actual machine, because of various factors, as shown in FIG. 2, the workpiece W is sometimes conveyed on a conveying track D that draws a sine curve. That is, the workpiece W is sometimes conveyed along the conveying direction A while being periodically reciprocatingly displaced (meandering) in a width direction B orthogonal to the conveying direction A. When the workpiece W is conveyed on the conveying track D having the sine curve shape, it is likely that accurate work cannot be performed on the workpiece W if the driving of the robot 200 is controlled based on a position command that is based on a premise that the workpiece W is linearly conveyed along the conveying direction A.

Therefore, before performing work on the workpiece W, the control device 400 detects the conveying track D of the workpiece W, corrects the position command for the robot 200 based on the detected conveying track D, and controls the driving of the robot 200 based on the corrected position command. Consequently, it is possible to smoothly and accurately perform work on the workpiece W conveyed along the conveying track D.

Various factors are conceivable as a factor that causes periodical reciprocating displacement of the workpiece W in the width direction B (hereinafter simply referred to as "displacement in the width direction B"). Among the factors, a factor caused by the conveying roller 630 is particularly significant. Therefore, in the following explanation, displacement of the workpiece W in the width direction B caused by the conveying roller 630 is representatively explained.

The conveying roller 630 is designed in a columnar shape in order to smoothly convey the belt 620. However, depending on formation accuracy of the conveying roller 630, for example, the entire shape of the conveying roller 630 sometimes deviates from the columnar shape. If the shape of the conveying roller 630 deviates from the columnar shape, the belt 620 is sometimes periodically reciprocatingly displaced in the width direction B with the conveying roller 630 rotating due to the deviation. The belt 620 itself is periodically reciprocatingly displaced in the width direction B in this way, whereby displacement in the width direction B of the workpiece W placed on the belt 620 occurs. The same phenomenon sometimes occurs because a rotation axis of the conveying roller 630 is tilted with respect to the width direction B or tilted with respect to the center axis.

A control method for the robot system 100 by the control device 400 is explained with reference to a flowchart of FIG. 3. As shown in FIG. 3, the control method for the robot system 100 by the control device 400 includes an image acquiring step S1, an error informing step S2, a reciprocating displacement information acquiring step S3, a determining step S4, a correcting step S5, and a work step S6. These steps are explained in detail below with reference to a flowchart of FIG. 4.

Image Acquiring Step S1

When conveyance of the workpiece W by the conveying device 600 is started, while the workpiece W passes through the imaging area E, the control device 400 continuously images, with the imaging section 300, the workpiece W at a predetermined frame rate and acquires a plurality of images G in which the workpiece W is imaged. The number of images G is not particularly limited. However, a larger number of images G is more preferable. As the number of images G is larger, coordinates of the workpiece W at respective times can be learned at a shorter time interval. Therefore, in the later reciprocating displacement information acquiring step S3, it is possible to accurately detect the conveying track D.

When a necessary number of images G is represented as X, the diameter of the conveying roller 630 is represented as R [mm], the ratio of the circumference of a circle to its diameter is represented as $\pi$, conveying speed of the workpiece W in the conveying direction A of the conveying device 600 is represented as V [mm/s], and a frame rate of the imaging unit 300 is represented as F [frame/s], the conveying speed V can be set from an expression $X < F \times \pi \times R/V$.

As shown in FIG. 1, length L in the conveying direction A of the imaging area E is equal to or larger than the circumference of the conveying roller 630. That is, $L \geq \pi \times R$. As explained above, the displacement in the width direction B of the workpiece W is caused by the conveying roller 630. Therefore, a period f of the conveying track D is equivalent to one rotation, that is, the circumference of the conveying roller 630. Therefore, by setting the length L of the imaging area E to be equal to or larger than the circumference of the conveying roller 630, the conveying track D equal to or larger than one period can be included in the imaging area E. As a result, it is possible to accurately detect the conveying track D in the reciprocating displacement information acquiring step S3. However, the length L is not particularly limited and may be smaller than the circumference of the conveying roller 630. That is, $L < \pi \times R$.

Error Informing Step S2

In the error informing step S2, the control device 400 informs of an error when the number of images G acquired in the image acquiring step S1 is smaller than a predetermined value. First, the control device 400 determines whether the number of images G acquired in the image acquiring step S1 is equal to or larger than the predetermined value. The predetermined value is stored in the control device 400 beforehand by a user or the like. When the number of images G is equal to or larger than the predetermined value, the control device 400 shifts to the next reciprocating displacement information acquiring step S3. On the other hand, when the number of images G is smaller than the predetermined value, the control device 400 informs the user of that effect as an "error". The control device 400 skips the reciprocating displacement information acquiring step S3, the determining step S4, and the correcting step S5 and shifts to the work step S6. Since the error is informed to the user, the user can easily notice that the number of images G necessary for detecting the conveying track D is insufficient. An informing method is not particularly limited. For example, the control device 400 may display the error on a monitor to inform of the error, may inform of the error by sound or warning sound, or may light or flash a warning lamp to inform of the error.

Reciprocating Displacement Information Acquiring Step S3

In the reciprocating displacement information acquiring step S3, the control device 400 calculates the conveying track D of the workpiece W based on the images G acquired in the image acquiring step S1 and generates reciprocating displacement information J including the conveying track D.

Specifically, first, the control device 400 calculates coordinates of the workpiece W at respective times from all the images G, calculates amplitude h and a period f of displacement in the width direction B of the workpiece W based on the calculated coordinates, calculates the conveying track D from the calculated amplitude h and the calculated period f, and generates the reciprocating displacement information J. A calculation method for the amplitude h and the period f is not particularly limited. In this embodiment, first, the control device 400 extracts two workpieces W having the largest separation distance in the width direction B out of all the images G. In other words, the control device 400 extracts, out of all the images G, the workpiece W located most on one side in the width direction B and the workpiece W located most on the other side in the width direction B. Subsequently, the control device 400 calculates the amplitude h and the period f based on coordinates of the extracted two workpieces W. The amplitude h can be calculated as a half of the separation distance in the width direction B between the extracted two workpieces W. The period f can be calculated as a double of a separation distance in the conveying direction A between the extracted two workpieces W. The control device 400 calculates the conveying track D from the calculated amplitude h and the calculated period f and generates the reciprocating displacement information J. With such a method, the reciprocating displacement information J can be acquired by a simple arithmetic operation.

Determining Step S4

In the determining step S4, the control device 400 determines whether the reciprocating displacement information J generated in the reciprocating displacement information acquiring step S3 based on the circumference of the conveying roller 630 is appropriate. As explained above, the displacement in the width direction B of the workpiece W is caused by the conveying roller 630. The period f of the conveying track D substantially coincides with the circumference of the conveying roller 630. Therefore, if large deviation is present between the period f and the circumference of the conveying roller 630, the control device 400 can determine that the conveying track D is not caused by the conveying roller 630 or a calculation process for the conveying track D is wrong.

Therefore, in the determining step S4, the control device 400 compares the circumference of the conveying roller 630 and the period f of the conveying track D and, considering slight variation, determines whether the period f is within a predetermined range, in this embodiment, a range of ±5% with respect to the circumference of the conveying roller 630. The consideration of variation only has to be set as appropriate. If the period f is within the predetermined range, the control device 400 determines that the conveying track D is an appropriate conveying track caused by the conveying roller 630 and shifts to the next correcting step S5. On the other hand, if the period f is outside the predetermined range, the control device 400 determines that the conveying track D is an inappropriate conveying track not caused by the conveying roller 630, skips the correcting step S5, and shifts to the work step S6.

By performing the determining step S4, it is possible to exclude displacement not caused by the conveying roller 630 such as displacement in the width direction B of the workpiece W that suddenly occurs. If the calculation in the reciprocating displacement information acquiring step S3 is wrong, the calculation can be performed again. Therefore, in the later correcting step S5, a position command can be corrected based on the appropriate reciprocating displacement information J.

Correcting Step S5

In the correcting step S5, the control device 400 associates the reciprocating displacement information J and the position in the conveying direction A of the workpiece W and corrects a position command. Specifically, as shown in FIG. 2, the control device 400 performs, for the position command, correction for shifting a track of the robot 200 in the width direction B for each of positions p1, p2, p3, . . . , and pn in the conveying direction A of the workpiece W by amplitudes h1, h2, h3, . . . , and hn in the positions. Consequently, a position command generated based on the premise that the workpiece W is linearly conveyed in the conveying direction A is corrected to a position command based on the premise that the workpiece W is conveyed along the conveying track D. With such a method, it is possible to accurately correct the position command.

Work Step S6

In the work step S6, the control device 400 controls the driving of the robot 200 based on the position command after the correction to thereby perform work on the workpiece W. Consequently, it is possible to perform smooth and accurate work on the workpiece W conveyed along the conveying track D. However, when the error is informed in the error informing step S2 and when it is determined in the determining step S4 that the reciprocating displacement information J is inappropriate, the reciprocating displacement information J is not acquired. Therefore, the control device 400 does not correct the position command and controls the driving of the robot 200 based on the uncorrected position command to thereby perform work on the workpiece W.

If the position command is corrected at the time of work for the workpiece W in the beginning, the same position command can be repeatedly used at the time of work for the workpiece W thereafter. Therefore, in this embodiment, the position command after the correction is repeatedly used until work for a predetermined number of workpieces W is ended. When the error is informed in the error informing step S2 and when it is determined in the determining step S4 that the reciprocating displacement information J is inappropriate, every time a new workpiece W is conveyed, the control device 400 only has to perform the control method from the image acquiring step S1 again until the position command is corrected.

The robot system 100 and the control method for the robot system 100 are explained above. As explained above, such a control method for the robot system 100 is a control method for the robot system 100 including the conveying device 600 that conveys the workpiece W, which is a target object, and the robot 200 that performs work while following the workpiece W conveyed by the conveying device 600, the control method including the image acquiring step S1 for imaging, a plurality of times, the workpiece W conveyed by the conveying device 600 and acquiring a plurality of images G, the reciprocating displacement information acquiring step S3 for acquiring, based on the plurality of images G, the reciprocating displacement information J indicating periodical reciprocating displacement in the width direction B orthogonal to the conveying direction A of the workpiece W, and the correcting step S5 for correcting a position command for the robot 200 based on the reciprocating displacement information J. Consequently, it is possible to perform accurate work on the workpiece W conveyed in the conveying direction A while being displaced in the width direction B.

As explained above, in the reciprocating displacement information acquiring step S3, the control device 400 extracts two workpieces W having the largest separation distance in the width direction B out of all the images G and acquires the reciprocating displacement information J based on the positions of the extracted two workpieces W. With such a method, the reciprocating displacement information J can be acquired by a simple arithmetic operation.

As explained above, in the correcting step S5, the control device 400 associates the reciprocating displacement information J and the position in the conveying direction A of the workpiece W and corrects the position command. Consequently, the position command can be accurately corrected.

As explained above, in the control method for the robot system 100, the conveyance by the conveying device 600 is performed by driving the belt 620 with the rotation of the conveying roller 630. The control method for the robot system 100 includes the determining step S4 for determining, based on the circumference of the conveying roller 630, whether the reciprocating displacement information is appropriate. The determining step S4 is performed after the reciprocating displacement information acquiring step S3 and before the correcting step S5. Consequently, it is possible to prevent the position command from being corrected by inappropriate reciprocating displacement information J.

As explained above, the length L in the conveying direction A of the imaging area E, which is a range in which an image is captured in the image acquiring step S1, is equal to or larger than the circumference of the conveying roller 630. Consequently, the conveying track D equal to or larger than one period can be generated in the imaging area E. Therefore, the reciprocating displacement information J can be more accurately acquired.

As explained above, the control method for the robot system 100 includes the error informing step S2 performed after the image acquiring step S1, the error informing step S2 informing of an error when the number of images G acquired in the image acquiring step S1 is smaller than the predetermined value. Consequently, the user can easily notice that the number of images G is insufficient.

As explained above, the robot system 100 includes the conveying device 600 that conveys the workpiece W, which is a target object, the robot 200 that performs work while following the workpiece W conveyed by the conveying device 600, the imaging section 300 that images the workpiece W conveyed by the conveying device 600, and the control device 400 that acquires, based on a plurality of images G captured by the imaging section 300, the reciprocating displacement information J indicating periodical reciprocating displacement in the width direction B orthogonal to the conveying direction A of the workpiece W and corrects a position command for the robot 200 based on the reciprocating displacement information J. Consequently, it is possible to perform accurate work on the workpiece W conveyed in the conveying direction A while being displaced in the width direction B.

The control method for the robot system and the robot system according to the present disclosure are explained above with reference to the embodiment shown in the figures. However, the present disclosure is not limited to this. The components of the sections can be replaced with any components having the same functions. Any other components may be added to the present disclosure.

In the embodiment explained above, the robot 200 is fixed to the floor and is caused to follow the workpiece W by the driving of the manipulator 220. However, not only this, but, for example, the base 230 may be fixed to a moving section such as an automatic guided vehicle (AGV) and travel in parallel to the workpiece W conveyed by the conveying device 600, whereby the robot 200 may perform work on the workpiece W.

What is claimed is:

1. A control method for a robot system including a conveying device configured to convey a target object and a robot configured to perform work while following the target object conveyed by the conveying device, the control method for the robot system comprising: an image acquiring step for imaging, a plurality of times, the target object conveyed by the conveying device and acquiring a plurality of images; a reciprocating displacement information acquiring step for acquiring, based on the plurality of images, reciprocating displacement information indicating periodical reciprocating displacement in a width direction orthogonal to a conveying direction of the target object; and a correcting step for correcting a position command for the robot based on the reciprocating displacement information, wherein the reciprocating displacement information acquiring step includes calculating amplitude and a period of displacement in the width direction of the target object, calculating a conveying track from the calculated amplitude and the calculated period, generating the reciprocating displacement information on basis of the conveying track, and controlling the driving of the robot based on the corrected position.

2. The control method for the robot system according to claim 1, wherein, in the reciprocating displacement information acquiring step, a pair of the target objects having a largest separation distance in the width direction are extracted out of all the images and the amplitude and the period of displacement in the width direction of the target object are calculated based on positions of the two target objects.

3. The control method for the robot system according to claim 1, wherein, in the correcting step, the reciprocating displacement information and a position in the conveying direction of the target object are associated and the position command is corrected.

4. The control method for the robot system according to claim 1, wherein
the conveyance by the conveying device is performed by driving a belt with rotation of a conveying roller,
the control method for the robot system further comprises a determining step for determining, based on a circumference of the conveying roller, whether the reciprocating displacement information is used in the correction step, and
the determining step is performed after the reciprocating displacement information acquiring step and before the correcting step.

5. The control method for the robot system according to claim 4, wherein length in the conveying direction of a range in which the image is captured in the image acquiring step is equal to or larger than the circumference of the conveying roller.

6. The control method for the robot system according to claim 1, further comprising an error informing step for informing an error when the number of images acquired in the image acquiring step is smaller than a predetermined value.

7. A robot system comprising: a belt conveyor configured to convey a target object; a robot configured to perform work while following the target object conveyed by the conveying device; camera configured to image the target object conveyed by the conveying device; and a control device including a processor configured to acquire, based on a plurality of images captured by the imaging section, reciprocating displacement information indicating periodical reciprocating displacement in a width direction orthogonal to a conveying direction of the target object and correct a position command for the robot based on the reciprocating displacement information, wherein the processor further configured to calculate amplitude and a period of displacement in the width direction of the target object, calculate a conveying track from the calculated amplitude and the calculated period, generate the reciprocating displacement information on basis of the conveying track, and control the driving of the robot based on the corrected position.

* * * * *